United States Patent
Merkli et al.

(10) Patent No.: US 8,226,011 B2
(45) Date of Patent: Jul. 24, 2012

(54) METHOD OF EXECUTING AN APPLICATION IN A MOBILE DEVICE

(75) Inventors: Jean-Daniel Merkli, Zürich (CH); Michael Rohs, Berlin (DE)

(73) Assignee: Eidgenoessische Technische Hochshcule Zuerich, Zurich (CH)

( * ) Notice: Subject to any disclaimer, the term of this patent is extended or adjusted under 35 U.S.C. 154(b) by 969 days.

(21) Appl. No.: 11/910,921

(22) PCT Filed: Apr. 5, 2006

(86) PCT No.: PCT/CH2006/000196
§ 371 (c)(1),
(2), (4) Date: Nov. 25, 2007

(87) PCT Pub. No.: WO2006/105686
PCT Pub. Date: Oct. 12, 2006

(65) Prior Publication Data
US 2008/0194323 A1    Aug. 14, 2008

Related U.S. Application Data

(60) Provisional application No. 60/669,197, filed on Apr. 6, 2005.

(51) Int. Cl.
*H04M 1/66* (2006.01)
(52) U.S. Cl. .............. 235/462.46; 235/472.02
(58) Field of Classification Search ............ 463/25, 463/42
See application file for complete search history.

(56) References Cited

U.S. PATENT DOCUMENTS

| | | | | |
|---|---|---|---|---|
| 4,578,766 A | * | 3/1986 | Caddy | 345/440 |
| 5,103,490 A | * | 4/1992 | McMillin | 382/284 |
| 5,783,811 A | * | 7/1998 | Feng et al. | 235/462.42 |
| 6,309,306 B1 | | 10/2001 | Geagley et al. | |

(Continued)

FOREIGN PATENT DOCUMENTS

JP    06176131 A    6/1994

(Continued)

OTHER PUBLICATIONS

Rekimoto et al, Augment-able Reality: Situated Communication Through Physical and Digital Spaces, Oct. 19, 1998, Second International Symposium on Wearable Computers, pp. 68-75.

(Continued)

*Primary Examiner* — Masud Ahmed
(74) *Attorney, Agent, or Firm* — Wilmer Cutler Pickering Hale and Dorr LLP

(57) ABSTRACT

For executing an application (13) in a mobile device (1) comprising a camera (14), a visual background (2) is captured through the camera (14). A selected application (13) is associated with the visual background (2). The selected application (13) is executed in the mobile device (1). Determined are orientation parameters indicative of an orientation of the mobile device (1) relative to the visual background (2). Based on the orientation parameters, application-specific output signals are generated in the mobile device (1). Particularly, the captured visual background (2) is displayed on the mobile device (1) overlaid with visual objects based on the orientation parameters. Displaying the captured visual background with overlaid visual objects, selected and/or positioned dependent on the relative orientation of the mobile device (1), makes possible interactive augmented reality applications, e.g. interactive augmented reality games, controlled by the orientation of the mobile device (1) relative to the visual background (2).

9 Claims, 5 Drawing Sheets

U.S. PATENT DOCUMENTS

| | | | |
|---|---|---|---|
| 6,431,452 B2 * | 8/2002 | Feng | 235/472.01 |
| 6,604,682 B2 * | 8/2003 | Wakamiya et al. | 235/462.01 |
| 6,752,317 B2 * | 6/2004 | Dymetman et al. | 235/462.45 |
| 6,752,720 B1 | 6/2004 | Clapper et al. | |
| 6,832,729 B1 * | 12/2004 | Perry et al. | 235/472.01 |
| 2004/0258274 A1 * | 12/2004 | Brundage et al. | 382/100 |
| 2005/0242189 A1 * | 11/2005 | Rohs | 235/462.46 |
| 2006/0041632 A1 * | 2/2006 | Shah et al. | 709/217 |
| 2006/0202039 A1 * | 9/2006 | Wang et al. | 235/462.27 |
| 2006/0202040 A1 * | 9/2006 | Wang et al. | 235/462.27 |

FOREIGN PATENT DOCUMENTS

WO      9846323 A1    10/1998

OTHER PUBLICATIONS

Michael Rohs, Real-World Interaction with Camera Phones, Second International Symposium on Ubiquitous Computing Systems, Nov. 8-9, 2004, Tokyo, Japan, Revised Selected Papers, Lecture Notes in Computer Science, vol. 358, pp. 74-89.

* cited by examiner

METHOD OF EXECUTING AN APPLICATION IN A MOBILE DEVICE

CROSS-REFERENCE TO RELATED APPLICATION

This application claims the benefit of U.S. provisional application Ser. No. 60/669,197, filed Apr. 6, 2005.

FIELD OF THE INVENTION

The present invention relates to a method of executing an application in a mobile device. Specifically, the present invention relates to a method of executing an application in a mobile device comprising a camera, to a mobile device comprising a camera for capturing a visual background external to the mobile device, and to a computer program product controlling the mobile device.

BACKGROUND OF THE INVENTION

Mobile devices with built-in cameras have become more popular as inexpensive image sensors, e.g. based on CMOS technology, became available. Particularly, mobile radio telephones (cell phones) and PDA computers (personal digital assistant) are provided with built-in cameras. Images and videos captured through these cameras are stored locally in the mobile devices, off-loaded via device interfaces to personal computers, and/or transferred via mobile radio networks to servers or other mobile devices. Typical applications of mobile communication devices with built-in cameras include video telephony and visual supervision and monitoring of remote objects. Typically, the known applications of mobile devices having built-in cameras are limited to capturing, transferring, storing and/or displaying image (pictorial) data. If there is any further processing of captured image data in the mobile devices, it is limited to extracting information contained in the image data, e.g. a printed article number or a street name.

SUMMARY OF THE INVENTION

It is an object of this invention to provide a method of executing an application in a mobile device comprising a camera, as well as a suitable mobile device comprising a camera for capturing a visual background. In particular, it is an object of the present invention to provide a method of executing a game in a mobile device comprising a camera, as well as a suitable mobile device comprising a camera for capturing a visual background for the game.

According to the present invention, these objects are achieved particularly through the features of the independent claims. In addition, further advantageous embodiments follow from the dependent claims and the description.

According to the present invention, the above-mentioned objects are particularly achieved in that a visual background external to the mobile device is captured by the camera of the mobile device, a selected application is associated with the visual background, the selected application is executed in the mobile device, determined are orientation parameters indicative of an orientation of the mobile device relative to the visual background, and application-specific output signals are generated in the mobile device based at least on the orientation parameters. Depending on the embodiment, generated are visual output signals, acoustic output signals and/or tactile output signals. Thus, applications of the mobile device are not limited to capturing, storing, transferring and/or displaying the visual background, but the mobile device is used to generate output signals depending on its orientation relative to the visual background. In other words, the mobile device provides the orientation parameters as input data to an application running in the mobile device. Preferably, determining the orientation parameters includes determining changes in the orientation of the mobile device relative to the visual background. Moreover, the output signals are generated based on orientation parameters indicative of said changes in the orientation of the mobile device. Thereby, enabled are interactive applications controlled by changing the orientation of the mobile device relative to the visual background. Moreover, if there is more than one application available, the mobile device determines a selected application associated with the visual background. Consequently, the present invention makes it possible to execute interactive games (i.e. interactive game applications) in the mobile devices, wherein game related output signals are generated dynamically based on (current) orientation parameters. Moreover, defined states of the application, e.g. states of the interactive game, are defined based on the orientation parameters.

In a preferred embodiment, generating the output signals includes displaying on the mobile device the visual background overlaid with visual objects based on the orientation parameters. Displaying the captured visual background with overlaid visual objects, selected and/or positioned dependent on the relative orientation of the mobile device, make possible interactive augmented reality applications, e.g. interactive augmented reality games, controlled by the orientation of the mobile device relative to the visual background.

Preferably, the visual objects overlaid on the visual background are animated based on the orientation parameters. Animating the overlaid visual objects, depending on the orientation of the mobile device relative to the visual background, makes possible interactive augmented reality animations, e.g. animated interactive games.

In an embodiment, defined visual features in the visual background are detected from background image data representative of the visual background captured through the camera. For example, the defined visual features include at least one two-dimensional visual code having a built-in orientation-independent coordinate system. Preferably, determining the orientation parameters is based on the defined visual features detected, e.g. the two-dimensional visual code. In an embodiment, associating the selected application with the visual background is based on the defined visual features detected, particularly e.g. the two-dimensional visual code.

Depending on the application, the selected application is stored in the mobile device or it is loaded into the mobile device via a communication link.

In an embodiment, the application is a multi-user game and the selected application communicates the states of the game via a communication link to at least one other mobile device.

In a further embodiment, execution of functions of the selected application is triggered based on the orientation parameters. Moreover, in a variant, other applications are triggered based on the orientation parameters.

In yet a further embodiment, the selected application includes descriptive language statements. Correspondingly, executing the selected application includes interpreting the descriptive language statements by an execution engine in the mobile device. Thus, the output signals are generated by the execution engine as determined by the descriptive language statements.

In addition to the method of executing an application in a mobile device comprising a camera, as well as the suitable mobile device comprising a camera for capturing a visual background, the present invention also relates to a computer program product including computer program code means for controlling one or more processors of the mobile device, particularly, a computer program product including a computer readable medium containing therein the computer program code means.

BRIEF DESCRIPTION OF THE DRAWINGS

The present invention will be explained in more detail, by way of example, with reference to the drawings in which.

DETAILED DESCRIPTION OF THE PREFERRED EMBODIMENTS

Figure 1:
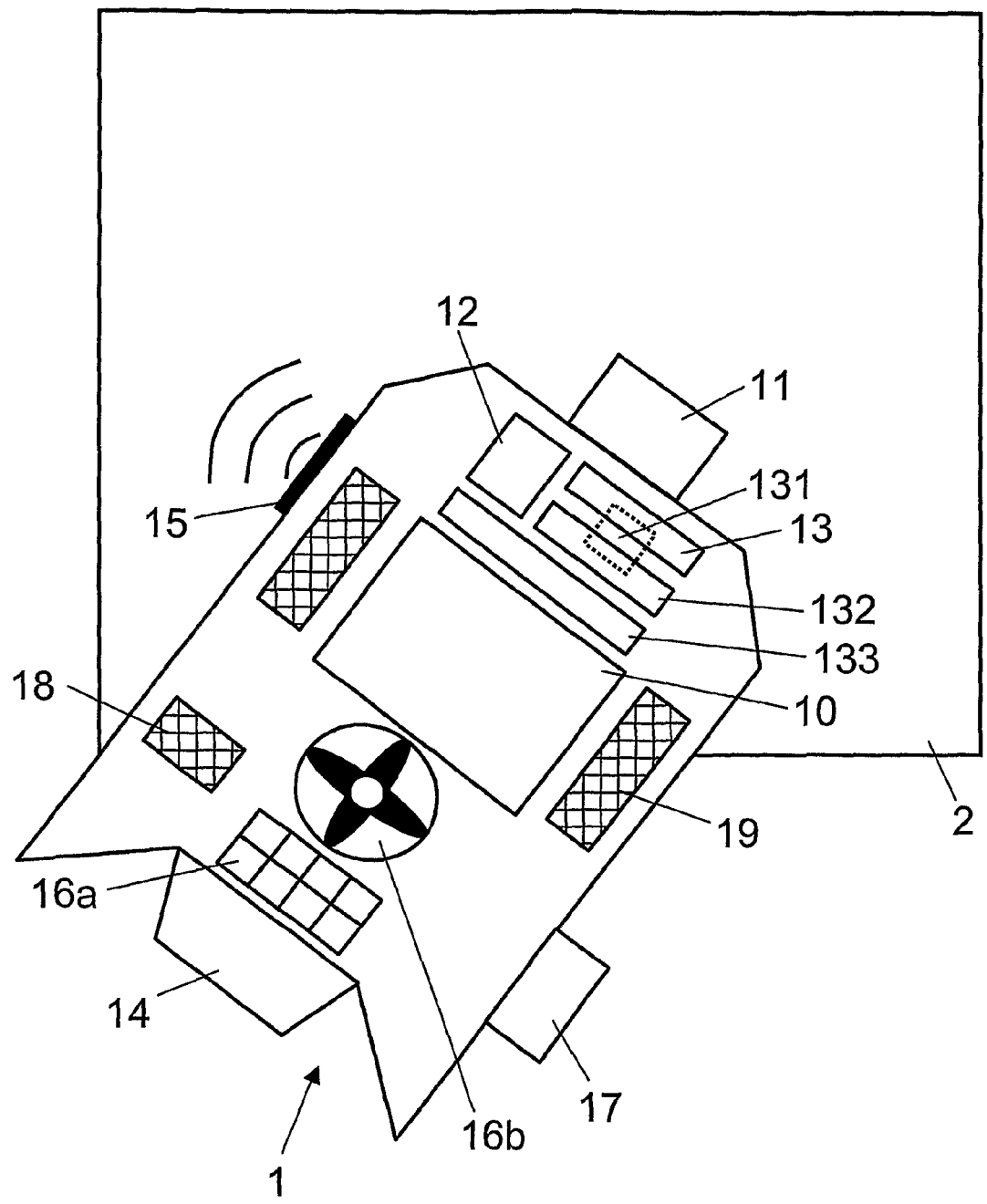
FIG. 1 shows a block diagram illustrating schematically an exemplary configuration of a mobile device comprising a camera for capturing a visual background.

In FIG. 1, reference numeral 2 refers to a two- or three-dimensional visual background. The visual background 2 is printed on a surface, projected with a beamer, or electronically displayed, e.g. on a computer monitor or television screen (LCD, plasma, CRT, etc). The visual background 2 is static, e.g. a comic strip printed in a newspaper, or dynamically changing, for example depending on time or on a current state of a game, e.g. an electronic large-scale public display or a movie theatre screen. Particularly, electronic or projected background media may change over time—either continuously or replacing the presented content as a whole. A typical background medium is a product package, such as a box of cereals, that has an area on its back side containing a drawing or photography. Other examples of printed media include newspapers, magazines, tickets, posters, flyers, comic books, cartoons, CD covers, and lottery coupons. Generally, printed media comprise paper, plastic, or any other substrate that can be painted on. Examples of projected background media are beamer-generated images on large screens or floor projections in public locations. Electronic displays can also be used as background media. The background medium can be a single medium, like a product package, composed of multiple media, or any real-world scene. In a preferred embodiment, the visual background 2 facilitates orientation detection by including defined visual features, i.e. machine-readable markers and visual markers that can be detected via image processing techniques, as will be explained later in more detail. In addition to facilitating orientation detection, the visual features also make possible identification of the visual background 2 and/or applications, e.g. games, associated with the visual background 2. Alternatively, other machine-detectable features on the background medium, e.g. RFID tags, are used to automatically identify the application and to compute the spatial orientation of the camera 14 relative to the visual background 2.

In FIG. 1, reference numeral 1 refers to a mobile device, e.g. a mobile radio phone (cellular phone), a PDA, a wrist watch, a tablet PC or the like. The mobile device 1 includes at least one processor as well as data and program storage media 17, e.g. a removable hard disk, flash memory disks (Compact Flash, Memory Stick, etc), optical storage media (CD, DVD, diskettes, etc) as well as internal memory (RAM, ROM, hard disk). In addition, the mobile device 1 includes a camera 14 integrated or removably attached to the mobile device 1. Moreover, the mobile device 1 includes various output devices such as a vibrator for tactile output, an internal or external loudspeaker 19 for acoustic output, and/or a display 10 for visual output, e.g. an LCD, LED or OLED display, optionally provided with touch screen capabilities. Furthermore, the mobile device 1 includes various input devices e.g. an internal or external keyboard 16a, a joystick 16b, a touch screen, an internal or external microphone 18, and/or a pen/stylus. In an embodiment, the mobile device 1 also includes a communication module 15, e.g. a device interface such as Bluetooth, ZigBee or Infrared (IrDA), or configured to communicate via telecommunications networks such as GSM (Global System for Mobile Communication), UMTS (Universal Mobile Telephone System) or a WLAN (Wireless Local Area Network). The mobile device 1 also includes an orientation detector 11 configured to determine the orientation of the mobile device relative to the visual background 2. Preferably, the orientation detector 11 is a programmed software module comprising image processing functions configured to determine orientation parameters indicative of an orientation of the mobile device 1 relative to the visual background based on defined visual features of the visual background 2, as will be explained later in more detail. Alternatively, the orientation detector 11 is implemented independently from camera 14 and does not rely on any visual features. Such an alternative orientation detector 11 includes a 6-D tracker, a distance sensor, an accelerometer, a gyroscope, a compass, a separate camera, ball switches, and/or other components. However, camera-independent orientation detectors require typically other techniques to achieve precise alignment ("registration") of the camera image with items in the visual background 2. The spatial orientation of the mobile device 1 relative to the visual background 2 is given either as a full 6-D orientation in space (3-D position plus pitch, roll, and yaw) or as a number of individual parameters such as target point, distance, rotation, and tilting of the camera relative to the visual feature. The mobile device 1 comprises further functional modules including a control module 12, at least one application (module) 13, an output generator 131, an execution engine 132, and an image processing module 133. These functional modules are preferably programmed software modules described later in more detail with reference to FIG. 3. The execution engine 132 may be preinstalled on the mobile device 1, stored on a separate storage medium, or dynamically downloaded via a communication network 3. The execution engine 132 may be a self-contained application or a generic interpreter of a description language for interactive augmented reality games and animations. As indicated schematically in FIG. 1, the output generator 131 may be part of the application (module) 13, part of the executing engine 132, or a separate module. One skilled in the art will understand that the orientation detector 11 and/or the above-mentioned functional modules can also be implemented fully or partly by means of hardware (e.g. using special purpose orientation detector hardware, and/or a programmed digital signal processor, DSP, or field programmable gate array, FPGA, or the like).

Figure 2:
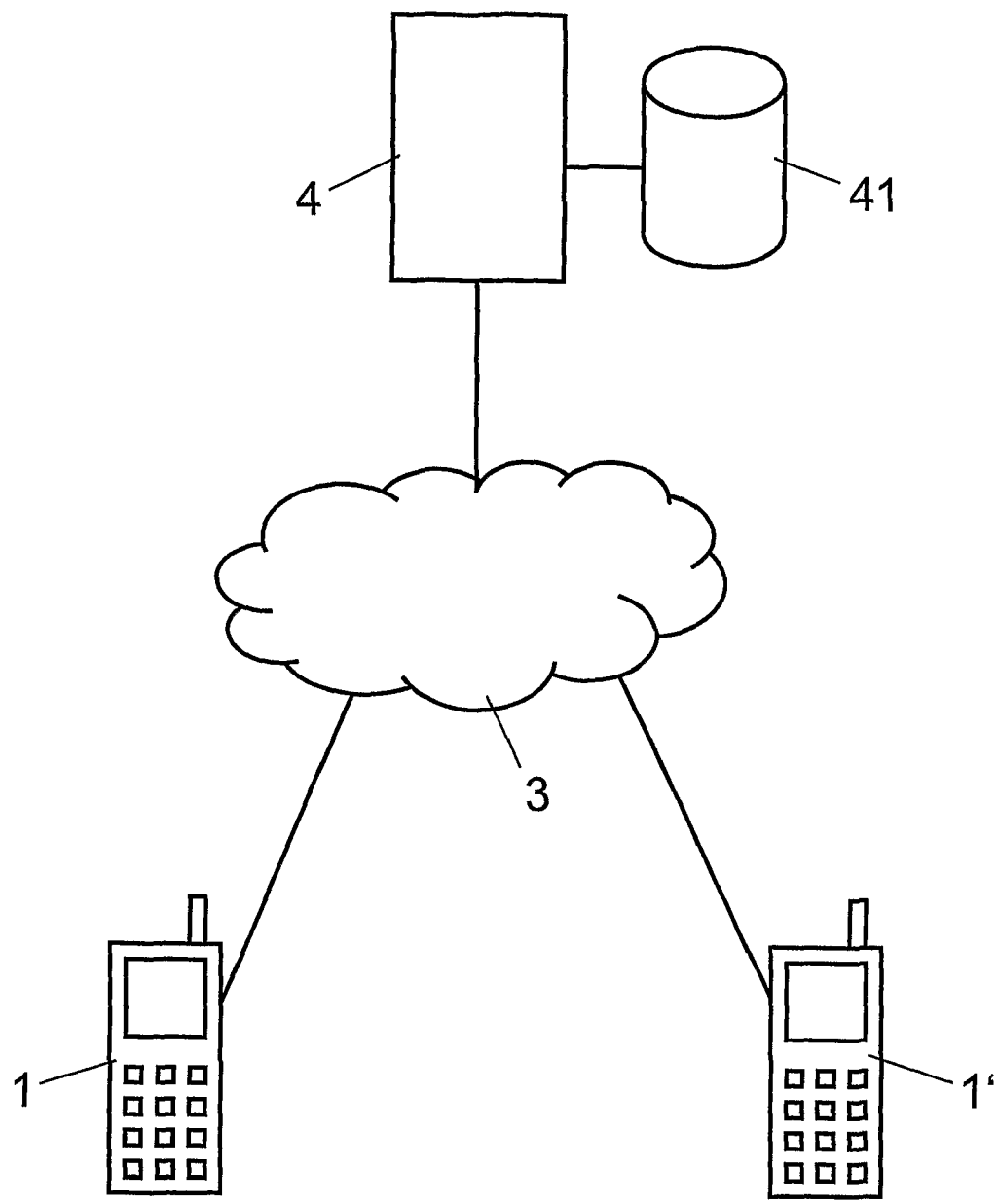
FIG. 2 shows a block diagram illustrating schematically two mobile devices connected through a telecommunications network.

As is illustrated in FIG. 2, in step S1 the mobile device 1 or the camera 14, respectively, is pointed at the visual background 2 such that the defined visual features are captured in the camera's image. Moreover, capturing and processing of the visual background 2 is initiated by the user, for example, using the mobile device's 1 input devices, e.g. by pressing a key or a button.

In step S2, responsive to the initiation in step S1, the control module 12 activates the camera 14 to capture a live (stream) or still image of the visual background 2.

In step S3, the control module 12 makes the image processing module 133 detect in the captured visual background 2, i.e. in the corresponding background image data, defined features for identifying the visual background 2, e.g. defined visual features such as a bar code, written information, or a visual code 22, or the control module 12 determines other machine-detectable features such as an RFID tag.

In step S4, the control module 12 determines an identification of the captured visual background 2 from the defined features detected in step S3. Furthermore, based on the visual background's 2 identity, the control module determines a selected application (module) 13 associated with the visual background 2.

In optional step S5, if the selected application (module) 22 is not stored in the mobile device 1, using the communication module 15, the control module 12 loads the selected application (module) 13 via a communication network 3 from an application server 4, as illustrated in FIG. 2. The application server 4 is connected to an application database 41, storing different applications, e.g. games, for different visual backgrounds 2. The communication network 3 includes a device interface such as Bluetooth, ZigBee or Infrared (IrDA), or a telecommunications networks such as GSM, UMTS, or a WLAN.

In step S6, the control module 12 initiates execution of the selected application (module) 13 in the mobile device 1. Depending on the embodiment, the selected application (module) 13 is an executable application running on a processor of the mobile device 1, or the selected application (module) 13 includes a description composed of descriptive language statements that are interpreted by the execution engine 132. The description, is based on a formal machine-readable language (in compiled or source form) that allows for defining certain aspects of the mobile device's behavior, such as graphical output, audio output, tactile output, controlling applications on the mobile device 1, and sending data over the communication network 3. The formal language allows for describing the mobile device's reaction to user input, particularly based on the mobile device's orientation relative to the visual background 2, but also on keyboard, touch-screen, and voice input. In addition, the language describes how the captured camera image is to be interpreted in order to trigger functions on the mobile device 1. The description language also allows for specifying the timed execution of operations, such as animations on the display 10. The description language is designed to easily describe interactive augmented reality games and animations on a high level and in a compact way. It has elements to specify graphical overlays, such as text; images of 2-D or 3-D objects; audio output; tactile output; the flow of animations in time; the use of device capabilities, such as sending data over the network or starting applications; rules for reacting to user input, such as orientation changes of the mobile device 1; rules for reacting to sensor input, such as the camera image; and rules for encoding the game and animation logic. The description is interpreted by the execution engine 132, which executes operations on the mobile device 1 accordingly and holds the current state of execution of the application, e.g. a state of a game.

Figure 4:
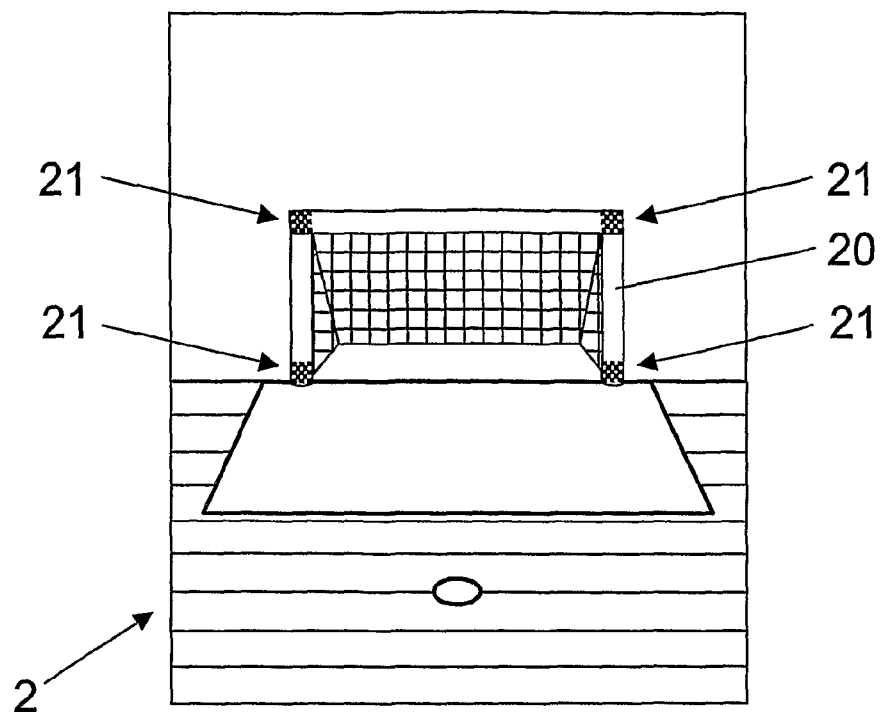
FIG. 4 shows an example of a visual background having defined visual features.
Figure 5:
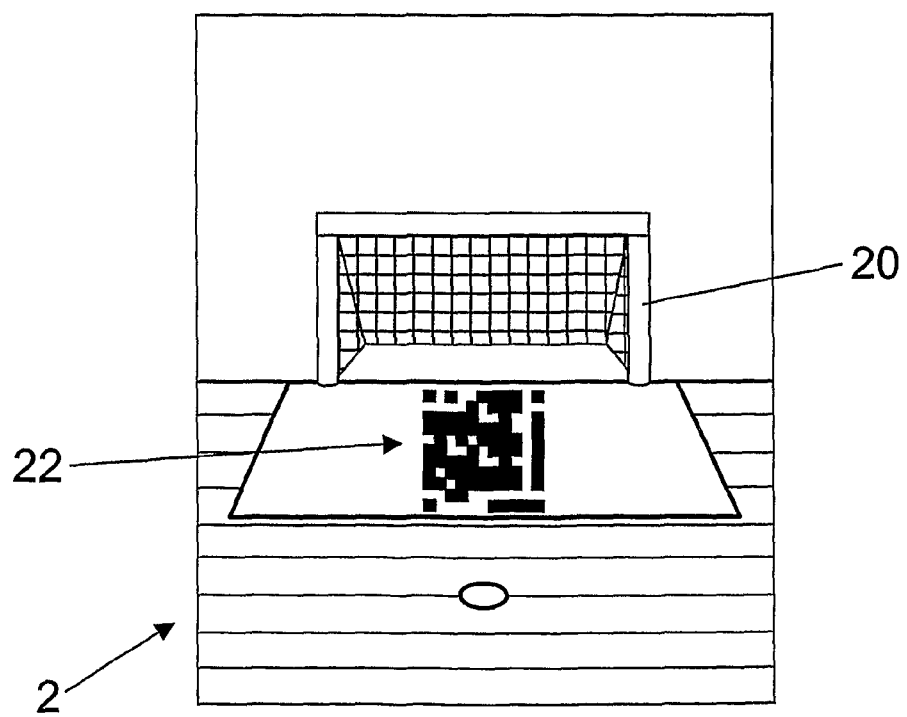
FIG. 5 shows an example of a visual background having defined visual features in the form of a two-dimensional visual code.

In step S7, the orientation detector 11 determines the orientation of the mobile device 1 relative to the visual background 2. In an embodiment, the orientation detector 11 uses a 6-D tracker to determine the spatial orientation of the mobile device 1 as a full 3-D position in space plus a 3-D orientation, e.g. given as pitch, roll, and yaw. Preferably however, the control module 12 makes the image processing module 133 detect in the captured visual background 2, i.e. in the corresponding background image data, defined features for determining the relative orientation of the mobile device 1, e.g. defined visual features such as defined visual markers 21, as illustrated in FIG. 4, a visual code 22, as illustrated in FIG. 5, or other visual features, e.g. four identical colored hats worn by people in a background crowd. From these defined visual features, the orientation detector 11 determines the orientation parameters indicating the current orientation of the mobile device 1 relative to the visual background 2. For example, the orientation parameters include the targeted point on the visual background 2 medium, the rotation, the horizontal and vertical tilting, the distance, and the relative movement, as will be explained in more detail below. In a variant, these parameters are retrieved from a 2-D barcode, as described in Michael Rohs, "Real-World Interaction with Camera Phones", 2nd International Symposium on Ubiquitous Computing Systems (UCS 2004), Tokyo, Japan, Revised Selected Papers, Springer LNCS 3598, pages 74-89, July 2005. Preferably, the visual features include a two-dimensional visual code 22 having a built-in orientation-independent coordinate system, as described in US 2005/0242189. In the case of extremely large visual backgrounds 2, e.g. large game boards on a theatre screen or a billboard, several visual codes are placed across the game board represented by the visual background 2, so that at least one is always visible. An essential feature of the visual code system is the mapping of points in the image plane to corresponding points in the visual code plane, and vice versa. With the help of this mapping, the pixel coordinates of the camera focus, which is the point the user aims at and which is indicated by a crosshair during view finder mode, for example, can be mapped to corresponding code coordinates. For example, in view finder mode, the camera provides a continuous stream of images at a size of 160×120 pixels. Each visual code 22 defines its own local coordinate system that has its origin at the upper left edge of the code and that is independent of the orientation of the code in the image. Areas that are defined with respect to the code coordinate system are thus invariant to projective distortion. The orientation parameters include the rotation of the visual code 22 in the captured image in degrees counterclockwise in the range of 0° to 359°. The orientation detector 11 also determines the tilting value between the image plane and the code plane. Horizontal tilting is defined as the angle between the x axis of the code coordinate system and the image plane. Analogously, vertical tilting denotes the angle between the y axis and the image plane. A tilting value of 1 indicates that the axis and the image plane are parallel. A tilting value less than 1 means tilting to the left/top, a value greater than 1 denotes tilting to the right/bottom. The (reading) distance between the visual code 22 and the camera 14 is defined in such a way that the value 100 is assigned to the distance at which the visual code 22 is just recognizable in the view finder mode. Defining the distance in terms of the size of the visual code in the image, instead of using the actual metric distance, keeps this parameter independent of camera's optical characteristics. It is still adequate for the interaction required in the present context. Finally, the orientation detector 11 combines the recognition algorithm with a visual movement detection algorithm that solely relies on image data provided by the camera 14. The movement detection provides (x, y, θ) triplets for relative linear and relative rotational movement. The movement detection does not rely on the presence of a visual code 22 in the image. All of the described parameters can be computed without knowing the optical characteristics of the camera 14 used, like the focal distance, for example. If these parameters are known, the tilting angles and the metric distance can be computed. As mentioned before, the orientation parameters can be computed without the use of the particular visual code 22 described above. The orientation parameters can even be computed without any visual code system in the narrower sense. In a variant, the orientation parameters are computed from the unaided visual appearance of the background, with the help of suitable computer vision techniques that automatically detect local interest points in the background. However, computing the orientation parameters reliably and with high performance puts a burden on the resource-constrained mobile devices. If four non-collinear known points, e.g. the visual markers 21 in the four corners of goal 20 shown in FIG. 4, are positioned in the camera image, an orientation-independent coordinate system, as well as the other parameters described above, can be computed using a planar homography. The visual background 2 needs to have four recognizable areas in the image that can be located by the image processing module 133. The known points can also be located from the corners of a rectangle that is visible in the visual background 2. The visual features to facilitate orientation detection may also be realized using a watermarking technique or invisible ink to make the orientation detection less obtrusive. A pattern of small dots can also be used to compute the location on the background medium. This technique is implemented by Anoto® Pens.

In step S8, output generator 131 generates application-specific output signals based at least on the orientation parameters determined in step S7. Thus the output signals are dependent on the orientation parameters as specified by the application (module) 13. Depending on the embodiment, the selected application (module 13) initiates functions of the output generator 131, integrated in or separate from the selected application (module 13), or the execution engine 132 initiates functions of the output generator 131, integrated in or separate from the execution engine 132, as specified by the application's descriptive language statements interpreted by the execution engine 132.

Figure 3:
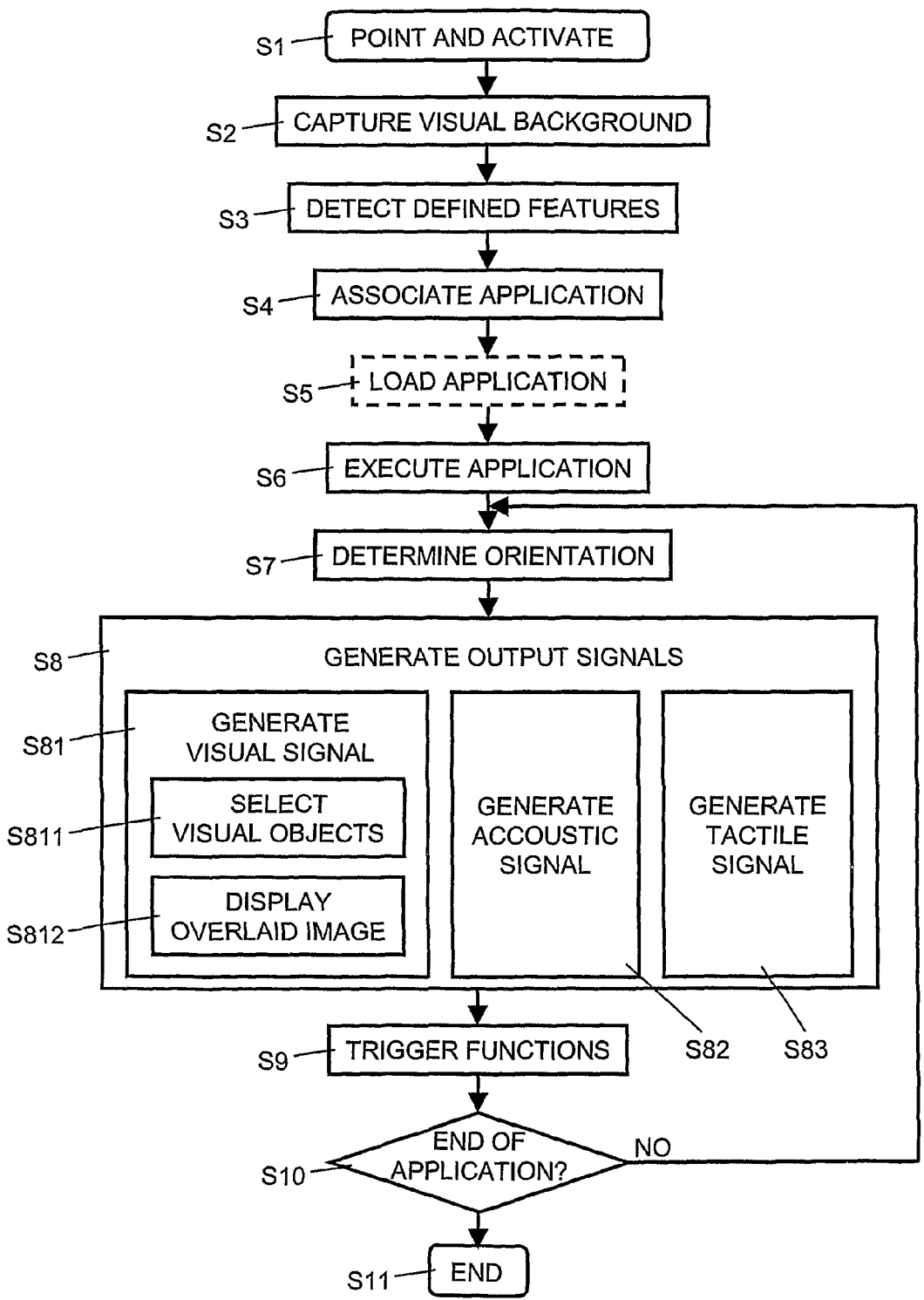
FIG. 3 shows a flow diagram illustrating an example of a sequence of steps executed according to the present invention for executing an application in a mobile device comprising a camera.

As indicated in FIG. 3, the output generator 131 generates visual signals (step S81), acoustic signals (step S82) and/or tactile signals (step S83) depending on the orientation parameters determined in step S7. To generate visual signals, output generator 131 uses display 10. To generate acoustic signals, output generator 131 uses loudspeaker 19. To generate tactile signals, output generator 131 uses a vibrator. The output generator 131 generates visual output, tactile output, acoustic output, or data output stored on the mobile device 1 or transmitted via the communication network 3.

In step S811, output generator 131 selects visual objects depending on the orientation parameters determined in step S7 as specified by the application (module) 13. The dynamically changing application-specific, e.g. game-related, visual objects that serve as graphical overlays over the live camera image shown on display 10 include images, icons, text, 2-D drawings, virtual 3-D objects, and GUI widgets, for example. For example, the 2-D or 3-D overlays are based on graphic libraries (e.g. OpenGL).

In step S812, output generator 131 displays the visual background 2 captured by the camera 14 and overlaid with the visual objects selected in step S811. Thus, in a game application, based on the coordinate system, defined by the visual features, e.g. the visual code 22, playing pieces and other game components are virtually placed at the correct position and with the correct perspective distortion on the display 10 of the mobile device 1 as an overlay over the live camera image (stream) of the visual background 2. The display 10 shows the camera image (stream) of the focused part of the visual background 2 as well as virtual graphical or textual overlaid over the camera image. The virtual graphical output is not only static, but can also be animated dynamically. The animations can be controlled by user input; particularly, animations can be controlled based on the orientation parameters.

Figure 6:
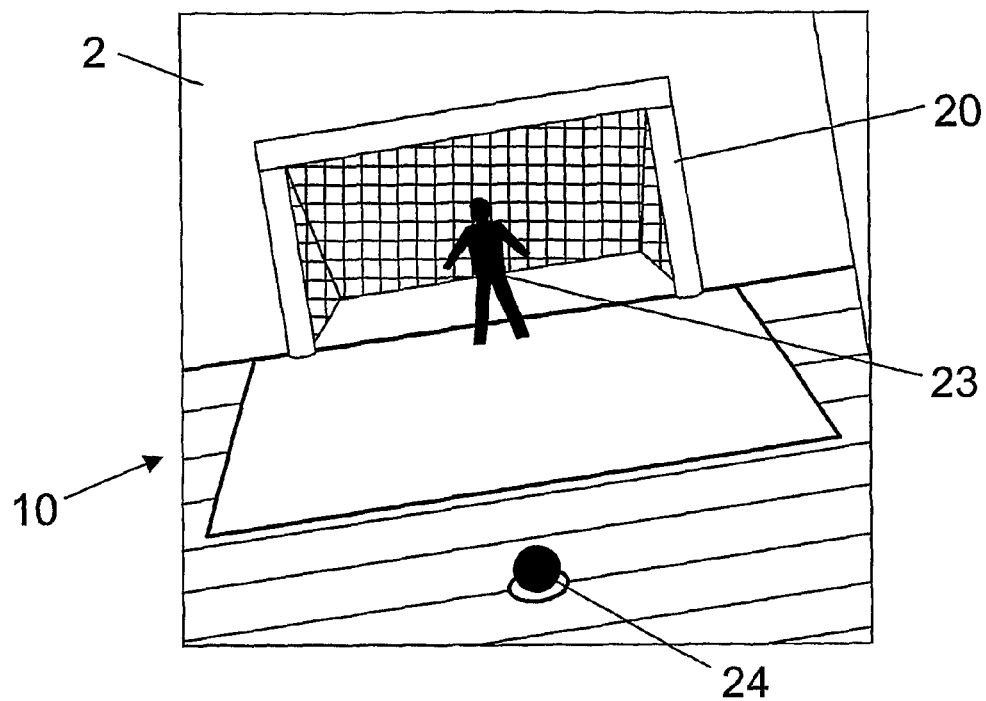
FIG. 6 shows an example of a display of a captured visual background overlaid with visual objects.

FIG. 6 depicts an example of display 10 showing an image of the visual background 2 captured by the camera 14 at a certain orientation. As is shown in FIG. 6, the output generator 131 selected and overlaid two visual objects, namely a ball 24, placed on a penalty point, and a goal keeper 23, centered in the goal 20. These visual objects are selected and placed based on the orientation parameters and the selected application (module) 13 or the respective current state of the application, respectively. FIG. 6 represents an application of a penalty shootout game at an initial state of the game.

In step S9, based on the orientation parameters and/or other user input, such as pressing a button or uttering a command word, the control module 12 triggers execution of functions of the selected application (module) 13 and/or sets states of the application (module) 13. In the present example of the penalty shootout game, such a function is, for example, the actual shooting (kicking) of the ball 24 after the user has directed the ball 24 by changing the orientation of the mobile device 1. Correspondingly, an other function repositions the goal keeper 23 responsive to the shooting of the ball 24. Thus the visual objects overlaid on the visual background 2 are animated by the output generator 131, depending on the orientation of the mobile device 1 relative to the visual background, as determined by the selected application (module) 13 or the current state of the application, respectively. In case of a multi-user game another application function transfer states of the application via the communication network 3 to application server 4 and/or to another mobile device 1', as shown in FIG. 2.

Figure 7:
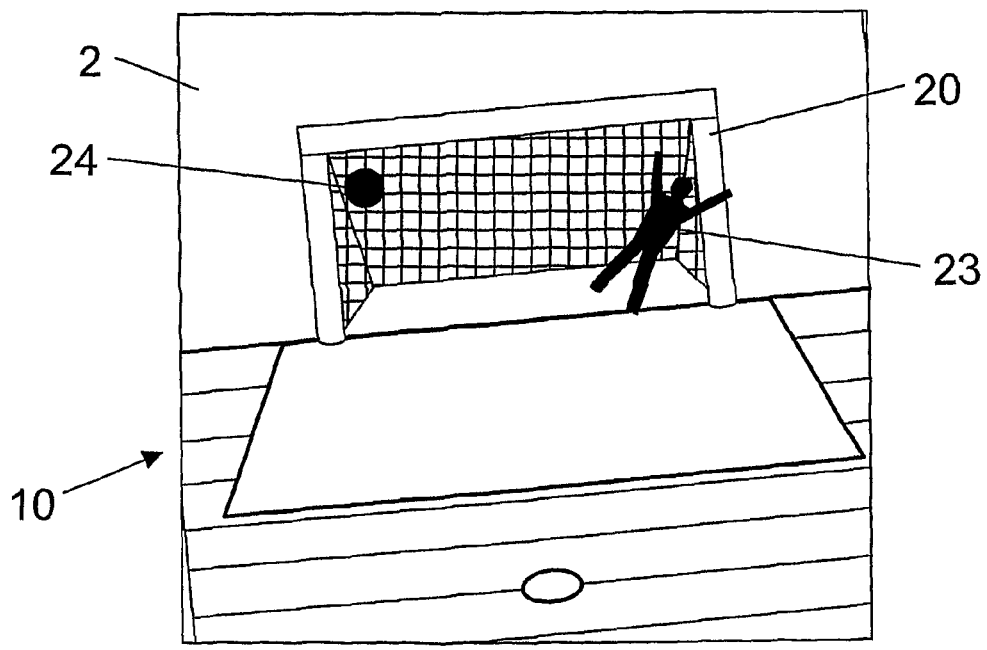
FIG. 7 shows another example of the display of the captured visual background having the overlaid visual objects repositioned.

FIG. 7 depicts a further example of display 10 showing the image of the visual background 2 captured by the camera 14 at a later point in time at an orientation different from FIG. 6. As is shown in FIG. 7, determined by application state and current orientation parameters, the output generator 131 placed the two visual objects at different locations: ball 24 is placed in the left upper corner of goal 20, whereas goalkeeper 23 is placed on the right hand side of the goal 20. FIG. 7 represents the penalty shootout game at an advanced state of the game, after the user had adjusted the orientation of the mobile device 1 to aim the ball 24 at the left upper corner of the goal 20 and had triggered a shot of the ball 24 in that direction by means of a sudden forward move of the mobile device 1, a click of button, or uttering a command word, for example.

In step S10, the control module 12 checks whether or not the application has completed. If the application has not completed, the control module proceeds to step S7 (continues to capture the visual background 2) and determines the current orientation of the mobile device 1. Thus, determined are changes in the orientation of the mobile device 1 relative to the visual background 2. Subsequently, further output signals are generated based on orientation parameters indicative of these changes. Thus the live camera image of the focused part of the visual background 2 and its graphical overlays shown on display 10 are (constantly) updated in real time as the mobile device 1 changes its orientation relative to the visual background 2. Otherwise, if the application has completed, the control module 12 ends the selected application in step S11.

The proposed method and mobile device 1 make possible "augmented reality games" where the game board is provided as a visual background 2 but interactions with the game are performed through the mobile device 1. In contrast to conventional mobile gaming devices, the proposed method and mobile device 1 do not require the user to control the game by extensive use of the keypad or touch screen. Instead, applied are interaction primitives with respect to defined visual features in the visual background 2, particularly visual code interaction primitives, such as rotation and tilting, that the user performs by changing the orientation of the mobile device 1 relative to the visual background 2. The necessary actions to interact with an application, e.g. a game, are simple and intuitive spatial mappings. In the penalty shootout game, for example, aiming at the goal 20 requires rotation and tilting. The amount of device rotation relative to the goal 20 controls the horizontal shot direction. The amount of tilting of the mobile device 1 controls the vertical shot direction (high or flat shot). The user kicks the ball 24 by pressing a joystick key or using another defined user input. Upon pressing the key, the ball 24 is animated to move quickly towards the goal 20 (or misses it, if the user did not aim right) and the goal keeper 23 is animated to jump to one of four possible positions, for example, to either catch or miss the ball 24 with a fixed probability. The game instructions require just a few words, they can even be explored by users in a few trials without any instructions. For example, in a deployment, the game is associated with a lottery, e.g. to win another box of cereal.

The proposed method and mobile device 1 enable single- and multiplayer games not only on small scale backgrounds but also on large scale background media such as movie theatre screens or big posters that serve as playing surface for augmented reality games. Multiple players can play games at the same time. The plot of the game can be based on a single player plot (each player plays his game individually) or on a multi-player plot, where the game and the game state is influenced by other participants. Depending on the state of the game, the image displayed on the playing surface and the graphics overlaid on the mobile device 1 change. Thus the large-scale playing surface and the handheld mobile device 1 complement each other: the user interface is split between the shared large-scale playing surface (acting as background medium) and one or more handheld mobile device 1, 1' (generating individual augmented reality overlays over the camera image).

In further embodiments, depending on the orientation parameters, the application overlays additional information (sports data, business data, weather data, global and local news, tourist information, etc.) on the captured image of the visual background 2, e.g. data retrieved from application server 4, from a positioning system such as GPS (Global Positioning System) or a mobile radio network, or from another mobile device 1'. Examples of possible applications include enhancing product packaging, posters, flyers, credit cards, ski passes, comic books or cartoons in newspapers, etc. with augmented reality games, animations and/or information; animating sports score boards and schedules; visually enhancing selection of options, e.g. by virtually adding and removing optional toppings on a personalized pizza; animating news by virtually overlaying the content based on the latest available set of data, eventually newer than the data used when the newspaper was printed; or providing orientation help on a map printed on a ticket or another sheet of paper. In the latter example, using visual codes 2, the map can be used as an animated guide. For example, the virtually overlaid graphics can show the way from a certain entrance to a particular seat (movie theatres, operas, etc.) or a particular gate or track (airport, railway station), from a certain location to the nearest toilette (shopping centers, cities, any place with toilettes) and so on. Additionally, the animation can be enhanced by making the current location of the mobile device available to the mobile device 1, e.g. based on GSM-cells, Bluetooth access points, GPS data, etc. Then, the animation starts at the current location. Every place of interest listed in a city guide is usually displayed on a map. Interactive maps can help tourists find their way around the city (e.g. museums, public transportation, etc) and provide an animated tour guide in paper form.

The foregoing disclosure of the embodiments of the invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents. Specifically, in the description, the computer program code has been associated with specific software modules, one skilled in the art will understand, however, that the computer program code may be structured differently, without deviating from the scope of the invention. Furthermore, the particular order of the steps set forth in the specification should not be construed as limitations on the claims. As one of ordinary skill in the art would appreciate, other sequences of steps may be possible while still remaining within the spirit and scope of the invention.

The invention claimed is:

1. A method of executing an application in a mobile device including a camera, the method comprising:

capturing through the camera a visual background external to the mobile device;

generating background image data representative of the visual background;

detecting from the background image data at least one barcode;

selecting an application based on information encoded in the at least one barcode;

associating the selected application with the visual background;

executing the selected application in the mobile device;

determining orientation parameters indicative of an orientation of the mobile device relative to the visual background using the at least one barcode; and generating application-specific output signals in the mobile device based at least on the orientation parameters, wherein the output signals include tactile signals and the selected application includes descriptive language statements;

wherein executing the selected application includes interpreting the descriptive language statements by an execution engine in the mobile device; and wherein generating the output signals includes generating the output signals by the execution engine as determined by the descriptive language statements of the selected application.

2. The method of claim 1, wherein generating the output signals includes displaying on the mobile device the visual background overlaid with visual objects based on the orientation parameters.

3. The method of claim 1, wherein generating the output signals includes animating the visual objects overlaid on the visual background based on the orientation parameters.

4. The method of claim 1, wherein determining the orientation parameters includes determining changes in the orientation of the mobile device relative to the visual background; and wherein generating output signals is based on orientation parameters indicative of said changes in the orientation of the mobile device.

5. The method of claim 1, wherein the at least one barcode includes at least one two-dimensional barcode having a built-in orientation-independent coordinate system.

6. The method of claim 1, further comprising loading the selected application via a communication link into the mobile device.

7. The method of claim 1, wherein the application is a game; wherein the output signals are game related output signals; and wherein the selected application defines states of the game based at least on the orientation parameters.

8. The method of claim 7, wherein the application is a multi-user game; and wherein the selected application communicates said states via a communication link to at least one other mobile device.

9. The method of claim 1, further comprising triggering execution of functions of the selected application based on the orientation parameters.

* * * * *